Patented Sept. 19, 1939

2,173,732

UNITED STATES PATENT OFFICE 2,173,732

ACCELERATOR OF VULCANIZATION

Lorin B. Sebrell, Silver Lake, and Albert M. Clifford, Stow, Ohio, assignors to Wingfoot Corporation, Akron, Ohio, a corporation of Delaware No Drawing. Application October 1, 1935, Serial No. 43,032

9 Claims. (Cl. 18—53)

This invention relates to a new and useful class of chemical compounds and to the method for preparing them. More particularly, it concerns a class of materials which may be termed thiazyl esters of monosubstituted dithiocarbamic acids. These compounds may be prepared by any known method but they are preferably formed by the interaction of a suitable salt of one of the above-mentioned dithiocarbamic acids with a 1-halogen aryl thiazole. While the new compounds may be used for any purpose for which they are suited, it has been found that they are in general good accelerators of the vulcanization of rubber.

The 1-chlor aryl thiazoles are particularly well adapted for the purposes of the invention. However, it will be understood that the practice of the invention may employ any other 1-halogen aryl thiazole. Typical examples of the chlor aryl thiazoles are 1-chlor 5-methoxy benzothiazole, 1-chlor tolyl thiazole, 1-chlor benzothiazole, 1-chlor 4-nitro benzothiazole, 1-chlor 5-ethoxy benzothiazole, 1-chlor 5-hydroxy benzothiazole, 1-chlor 3-5-dimethyl benzothiazole, 1-chlor 4-chlor benzothiazole, 1-chlor 5-chlor benzothiazole, 1-chlor 3-phenyl benzothiazole, 1-chlor 4-chlor 5-nitro benzothiazole, 1-chlor 3-methyl 5-nitro benzothiazole, and the similar 1-chlor naphthothiazoles. The corresponding 1-bromo thiazoles may likewise be employed. These 1-halogen aryl thiazoles may be prepared by the process disclosed in United States Patent No. 1,757,930. From the foregoing it will be observed that the terms "1-chlor aryl thiazoles" and "1-halogen aryl thiazoles" include non-hydrocarbon substituted aryl compounds as well as hydrocarbon aryl compounds.

The dithiocarbamates employed may be represented by the formula

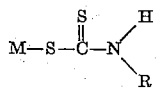

wherein R—NH is a primary amine residue and M is any reactive metallic radical or equivalent grouping, such as sodium, potassium, or ammonium, which does not seriously impair the solubility of the dithiocarbamate in the solvent employed in the reaction. While dithiocarbamates derived from any primary amine may be employed in the invention, those derived from primary aliphatic amines and primary amines having aliphatic characteristics, such as the alicyclic primary amines, the aralkyl primary amines and the tetrahydro furfuryl primary amines, are preferred. The dithiocarbamates may be prepared according to the known procedure of interacting carbon disulphide, an alkali, and a primary amine. In many cases, however, it will not be necessary to prepare the dithiocarbamate before its reaction with the 1-halogen thiazole; it is equally practicable to form the dithiocarbamate in situ in a suspension of the 1-halogen thiazole in a solvent such as ethyl alcohol.

Illustrative of the salts of the mono substituted dithiocarbamic acids which may be employed in the invention are sodium N-butyl dithiocarbamate, sodium benzyl dithiocarbamate, sodium beta phenethyl dithiocarbamate, potassium phenyl dithiocarbamate, ammonium ethyl dithiocarbamate, potassium cyclohexyl dithiocarbamate, sodium p-tolyl dithiocarbamate, sodium alpha furfuryl dithiocarbamate, ammonium tetrahydro alpha furfuryl dithiocarbamate, zinc isopropyl dithiocarbamate, sodium amyl dithiocarbamate, potassium o-methyl cyclohexyl dithiocarbamate, sodium p-ethoxy cyclohexyl dithiocarbamate, sodium o-methoxy cyclohexyl dithiocarbamate, sodium decahydro naphthyl dithiocarbamate, sodium methyl dithiocarbamate, sodium heptyl dithiocarbamate and potassium allyl dithiocarbamate.

The desired halogen aryl thiazole may be caused to react with any of the desired dithiocarbamates to produce the corresponding reaction product. Although it is not known to be true in all cases, it is believed that the reaction proceeds according to the following general equation:

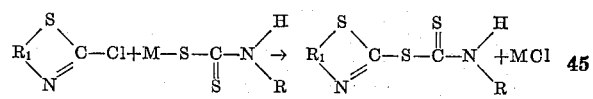

In certain cases other reactions may take place, yielding products which may or may not be separated, as desired, from the principal product. In many cases, as in the vulcanization of rubber, it may be desirable to employ the total composite reaction product as such.

The reaction product of 1-chlor benzothiazole and the sodium salt of n-butyl dithiocarbamic acid is an example of a compound falling within the scope of the invention. It may be prepared by refluxing in approximately equimolecular proportions, 1-chlor benzothiazole, primary n-butyl amine, carbon bisulphide, and sodium hydroxide in a solvent such as ethyl alcohol. After a period of from one to four hours, the reaction product precipitates as a crystalline material which may be washed with water to remove the sodium chloride formed in the reaction. When the product is further purified by recrystallization from alcohol, it has a melting point of 60–62 degrees C. The equation representing the reaction is probably as follows:

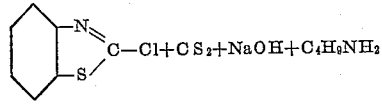

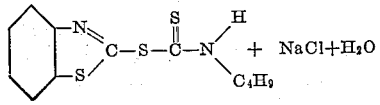

In similar manner 5-nitro benzothiazyl n-butyl dithiocarbamate melting at 254–255 degrees C. is obtained from 1-chlor 5-nitro benzothiazole, primary n-butyl amine, carbon bisulphide, and sodium hydroxide. Benzothiazyl cyclohexyl dithiocarbamate, melting at 146–150 degrees C., and 5-nitro benzothiazyl cyclohexyl dithiocarbamate, melting at 241–244 degrees C., may be obtained by employing cyclohexyl amine instead of n-butyl amine.

It will be understood that any of the dithiocarbamates derived from primary amines may be formed in situ and reacted with any 1-halogen aryl thiazole. Alternatively, a solution of the mono substituted dithiocarbamate may first be prepared after which it is reacted with the desired 1-halogen aryl thiazole. It is believed that by the practice of the invention any aryl thiazyl ester of a mono-substituted dithiocarbamic acid may be prepared without regard to the nature of the substituents in the aryl ring or to their position therein. It will also be understood that the 1-brom aryl thiazoles and other 1-halogen aryl thiazoles may be substituted for the 1-chlor aryl thiazoles. Similarly, the 1-halogen naphthothiazoles may be substituted for the 1-halogen benzothiazoles.

Conveniently, any one of these compounds or a mixture thereof may be added to any of the ordinary rubber mixes in an amount which may be determined according to the usual methods. It has been found, for example, that the accelerators of the present invention are effective in a rubber composition of the following formula:

| | Parts by weight |
|---|---|
| Acetone extracted rubber | 100 |
| Zinc oxide | 5 |
| Sulphur | 3 |
| Stearic acid | 1.5 |
| Accelerator | 0.5 |

Samples of the compounded rubber made up in accordance with this formula were subjected to vulcanization by steam heat in a mold after which they were subjected to physical tests to ascertain their elasticities and tensile strengths. Results of these tests are given in the following table:

| Cure in mins. at °F. | Ult. tensile in kgs/cm$^2$ | Maximum elongation | Modulus in kgs/cm$^2$ | |
|---|---|---|---|---|
| | | | 500% | 700% |
| BENZOTHIAZYL CYCLOHEXYL DITHIOCARBAMATE ||||||
| 20/260 | 75 | 805 | 9 | 48 |
| 40 | 132 | 725 | 22 | 110 |
| 80 | 120 | 680 | 30 | -------- |
| 60/285 | 98 | 695 | 24 | -------- |
| 5-NITRO BENZOTHIAZYL CYCLOHEXYL DITHIOCARBAMATE ||||||
| 20/260 | 77 | 865 | 10 | 36 |
| 40 | 110 | 825 | 17 | 54 |
| 80 | 137 | 815 | 21 | 70 |
| 60/285 | 118 | 790 | 22 | 68 |
| BENZOTHIAZYL N-BUTYL DITHIOCARBAMATE ||||||
| 20/260 | 180 | 765 | 18 | 125 |
| 40 | 205 | 705 | 42 | 187 |
| 80 | 204 | 690 | 50 | -------- |
| 60/285 | 150 | 680 | 46 | -------- |
| 5-NITRO BENZOTHIAZYL N-BUTYL DITHIOCARBAMATE ||||||
| 20/260 | 68 | 860 | 12 | 29 |
| 40 | 108 | 870 | 15 | 41 |
| 80 | 143 | 835 | 21 | 65 |
| 60/285 | 120 | 825 | 20 | 57 |

The properties of the accelerators described may also, in some cases, be improved by incorporating therewith a basic nitrogen-containing accelerator such as diphenyl guanidine, piperazine, hexamethylene tetramine, and similar bases which activate the thiazyl carbamates when incorporated into rubber stocks therewith. The following table shows the results obtained by employing as the accelerator in the rubber composition stated a mixture of 40% benzothiazyl n-butyl dithiocarbamate and 60% diphenyl guanidine.

| Cure in mins. at °F. | Ult. tensile in kgs/cm$^2$ | Maximum elongation | Modulus in kgs/cm$^2$ | |
|---|---|---|---|---|
| | | | 500% | 700% |
| 20/260 | 132 | 830 | 16 | 60 |
| 40 | 152 | 760 | 25 | 104 |
| 80 | 188 | 740 | 37 | 155 |
| 60/285 | 152 | 690 | 44 | -------- |

It will be understood that by the term "rubber" is meant any of the ordinary forms of rubber, such as rubber latex, balata, gutta percha, and the ordinary coagulated forms of the *Hevea brasiliensis* family. It will also be understood that the specifically described details of the invention as herein given may be varied within comparatively wide limits without departing from the inventive concept and that it is desired to embrace within the scope of this invention such modifications and changes as may be necessary to adapt it to varying conditions and use. It is intended that the patent shall cover by suitable expression in the appended claims whatever features of patentable novelty reside in the invention.

What we claim is:
1. A process of accelerating the vulcanization of rubber which comprises vulcanizing rubber in the presence of a compound having the formula

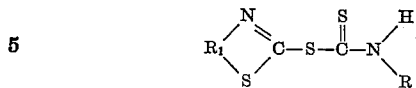

in which R₁ is arylene and

is the residue of a dithiocarbamic acid derived from a primary amine.

2. A process of accelerating the vulcanization of rubber which comprises vulcanizing rubber in the presence of an aryl thiazyl ester of a dithiocarbamic acid derived from a primary aliphatic amine.

3. A process of accelerating the vulcanization of rubber which comprises vulcanizing rubber in the presence of a nitro benzothiazyl ester of a dithiocarbamic acid derived from a primary amine.

4. A process of accelerating the vulcanization of rubber which comprises vulcanizing rubber in the presence of a benzothiazyl ester of cyclohexyl dithiocarbamic acid.

5. A rubber product that has been vulcanized in the presence of a compound having the formula

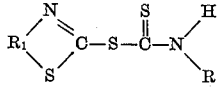

in which R₁ is aromatic and R is aliphatic.

6. A rubber product that has been vulcanized in the presence of an aryl thiazyl ester of a dithiocarbamic acid derived from a primary aliphatic amine.

7. A rubber product that has been vulcanized in the presence of a benzothiazyl ester of n-butyl dithiocarbamic acid.

8. A rubber product that has been vulcanized in the presence of a nitro benzothiazyl ester of a dithiocarbamic acid derived from a primary amine.

9. A process of accelerating the vulcanization of rubber which comprises vulcanizing rubber in the presence of a compound having the formula

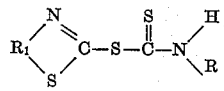

in which R₁ is an ortho phenylene radical and R is a cyclohexyl radical.

LORIN B. SEBRELL.
      ALBERT M. CLIFFORD.